No. 678,504. Patented July 16, 1901.
J. MOOMY.
PNEUMATIC TIRE.
(Application filed Feb. 16, 1901.)

(No Model.)

Witnesses

Inventor
Joseph G. Moomy,
by N. C. Lord,
Atty.

THE NORRIS PETERS CO., PHOTO-LITHO., WASHINGTON, D. C.

UNITED STATES PATENT OFFICE.

JOSEPH G. MOOMY, OF ERIE, PENNSYLVANIA, ASSIGNOR TO LAKE SHORE RUBBER COMPANY, OF SAME PLACE.

PNEUMATIC TIRE.

SPECIFICATION forming part of Letters Patent No. 678,504, dated July 16, 1901.

Application filed February 16, 1901. Serial No. 47,678. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires and the process of making same; and it consists of certain improvements in the construction thereof, as will be hereinafter fully described, and pointed out in the claims.

Figure 1:
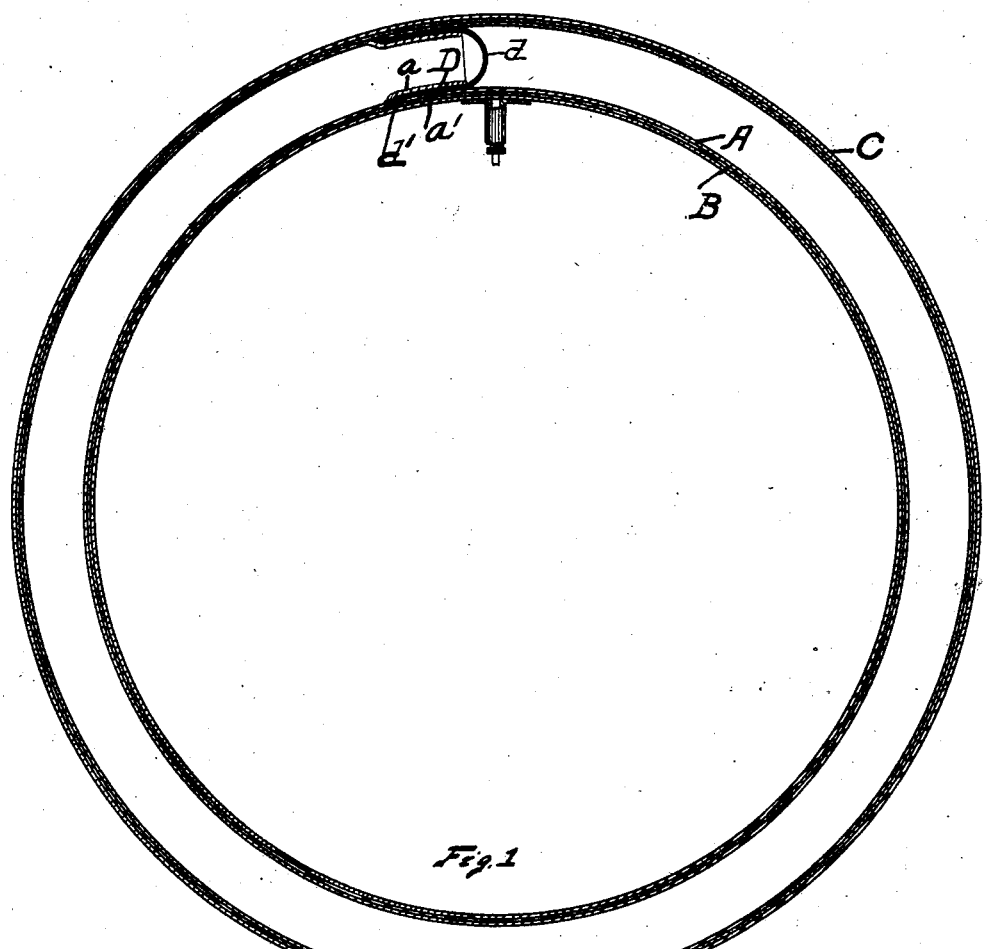
Figure 2:
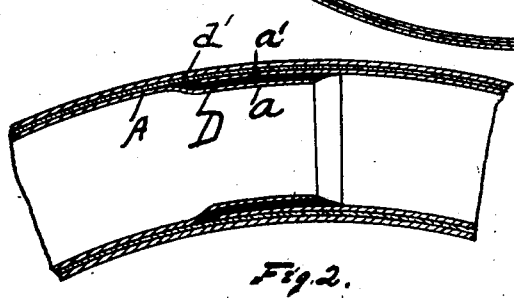
Figure 3:
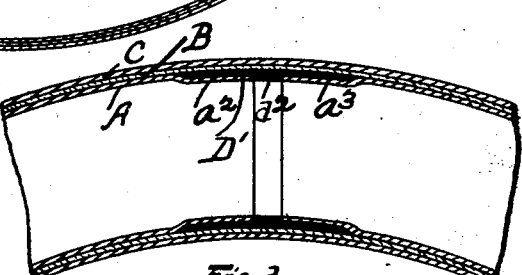

The invention is illustrated in the accompanying drawings, as follows:

Figure 1 shows an annular section of a tire embodying my preferred construction. Fig. 2 shows a section of a fragment of a tire, showing a modified form. Fig. 3 is a like view, also showing a modified form.

In the tire, A marks the air-tube, B preferably a textile fabric, and C an outer covering of rubber. The inner air-tube may be made of vulcanizing stock and vulcanized with the outer cover; but I prefer that it be vulcanized separately from the cover and then coated with cement and united with the cover in the process of vulcanization. It may, however, be loose from the cover and may, if desired, be removable from the cover. I prefer, however, as before stated, that it be vulcanized prior to the vulcanization of the cover and secured to the cover by vulcanization. The end $a$ of the air-tube is placed within the end $a'$ of said tube, and a sleeve D, of non-vulcanizing material, preferably caoutchouc, is placed between the lapped portions of the tube. If desired, the end of the sleeve D may be closed at $d$, forming a thimble. This construction assists somewhat in the process of manufacture. I prefer the sleeve D to be of sufficient length to a little more than fill the lapped portion of the tube, so as to pass beyond the end $a'$, as at $d'$. With this union of the air-tube it can be fully tested before the tire is made up, and as the stock forming the sleeve D is not changed by the vulcanizing-heat no blisters or air-passages are made in the completion of the tire. Where the ends of the tire are directly joined and united by vulcanization, as in the ordinary construction of to-day, blisters or air-passages are apt to be formed during the process of vulcanization of the tire, so that a complete tire is often spoiled in this way. With my construction, especially where the air-tube is vulcanized previously to the forming of the remainder of the tire, there is no chance of failure of the tube, and if the tube is properly tested before the formation of the tire no failure in the tire occurs during vulcanization by reason of the collapse of the air-tube. This feature, of course, is particularly desirable where the outer cover is formed of a complete annulus and vulcanized in this way over the tube.

In Fig. 2 I show a modified construction in that the thimble portion $d$ is omitted, and in Fig. 3 I show a modified construction, wherein the sleeve D' is placed outside of the ends $a^2 a^3$ of the tube A. A wall of non-vulcanizing material of the sleeve $d^2$ extends down between the ends of the tube.

What I claim as new is—

1. In a pneumatic tire, the combination of an inner air-tube; a sleeve of non-vulcanizing and adhesive material joining the ends of said tube; and an outer sleeve.

2. In a pneumatic tire, the combination of an inner air-tube; a sleeve of non-vulcanizing and adhesive material joining the ends of said tube; and an outer cover vulcanized and forming a complete annulus over said tube.

3. In a pneumatic tire, the combination of an inner air-tube; a sleeve of non-vulcanizing adhesive material joining the ends of said tube; and an outer cover to which the body of the tube is secured by vulcanization.

4. In a pneumatic tire, the combination of an inner air-tube; a sleeve of non-vulcanizing adhesive material joining the ends of said tube, the body of said tube being vulcanized prior to the formation of the tire; and an outer cover.

5. In a pneumatic tire, the combination of an inner air-tube; a sleeve of non-vulcanizing adhesive material joining the ends of said tube, the body of said tube being vulcanized prior to the formation of the tire; and an outer cover vulcanized and forming a complete annulus over said tube.

6. In a pneumatic tire, the combination of an inner air-tube; a sleeve of non-vulcanizing adhesive material joining the ends of said tube, the body of said tube being vulcanized prior to the formation of the tire; and an outer cover vulcanized and forming a complete annulus over the tube, the body of said tube being secured to the said cover by vulcanization.

7. In a pneumatic tire, the combination of an inner air-tube having one of its ends, $a$, lapped and within its other end, $a'$; a sleeve of non-vulcanizing adhesive material joining the ends of said tube, said sleeve extending through and between the lapped portion of the ends of the tube; and an outer cover.

8. In a pneumatic tire, the combination of an inner air-tube having one of its ends, $a$, lapped by and within its other end, $a'$; and a sleeve of non-vulcanizing adhesive material joining the ends of said tube, said sleeve extending through and between the lapped portion of the tube, and having a portion, $d'$, beyond the end, $a'$.

9. In a pneumatic tire, the combination of an inner air-tube having one of its ends, $a$, lapped by and within its other end, $a'$; a sleeve of non-vulcanizing adhesive material joining the ends of said tube, said sleeve extending through and between the lapped portion of the ends of the tube; an outer cover; and the thimble portion, $d$, extending from the end of the sleeve.

10. In a pneumatic tire, the combination of an inner air-tube, the end, $a$, of said tube being placed within and lapping by the end, $a'$, of said tube; a sleeve, D, of non-vulcanizing adhesive material arranged between the lapped ends of the air-tube; and an outer cover vulcanized over said tube.

11. In a pneumatic tire, the combination of an inner air-tube, the end, $a$, of said tube being placed within and lapping by the end, $a'$, of said tube, said air-tube being preferably vulcanized before the formation of the tire; a sleeve, D, of non-vulcanizing material arranged between the lapped ends of the air-tube; and an outer cover vulcanized over said tube.

12. A process of making a pneumatic tire, which consists of forming an inner air-tube, having its ends joined with a non-vulcanizing material, building over it a cover and vulcanizing the cover on the air-tube, said air-tube being inflated during the process of vulcanization.

In testimony whereof I affix my signature in presence of two witnesses.

JOSEPH G. MOOMY.

Witnesses:
  H. C. LORD,
  R. F. LANZA.